June 27, 1944.  R. R. WALTON  2,352,503
CONTAINER
Filed April 16, 1941  7 Sheets-Sheet 1
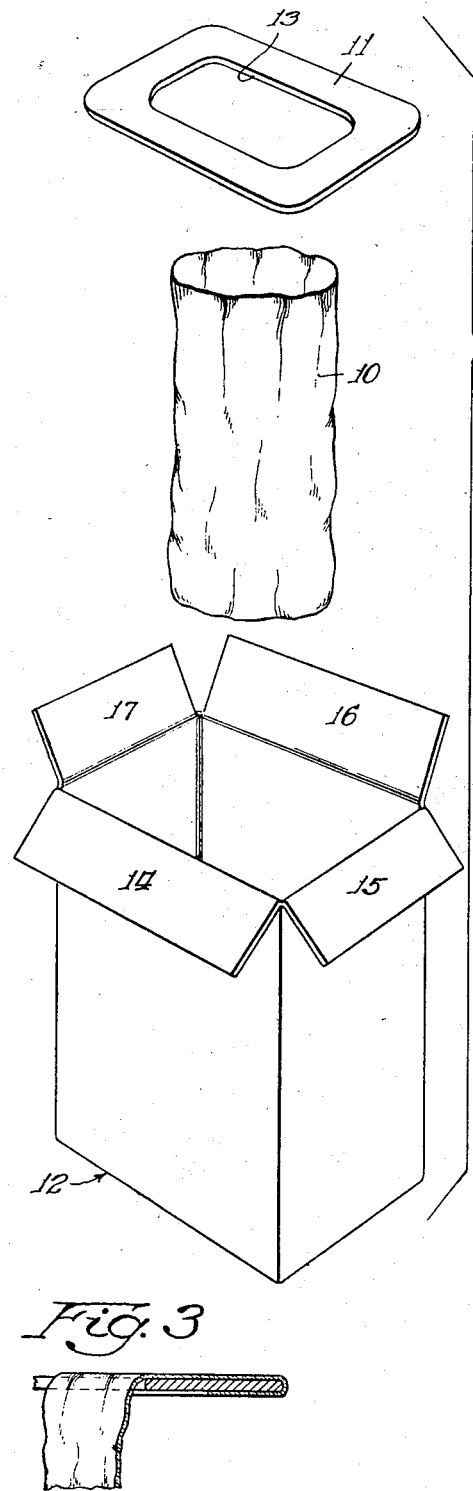
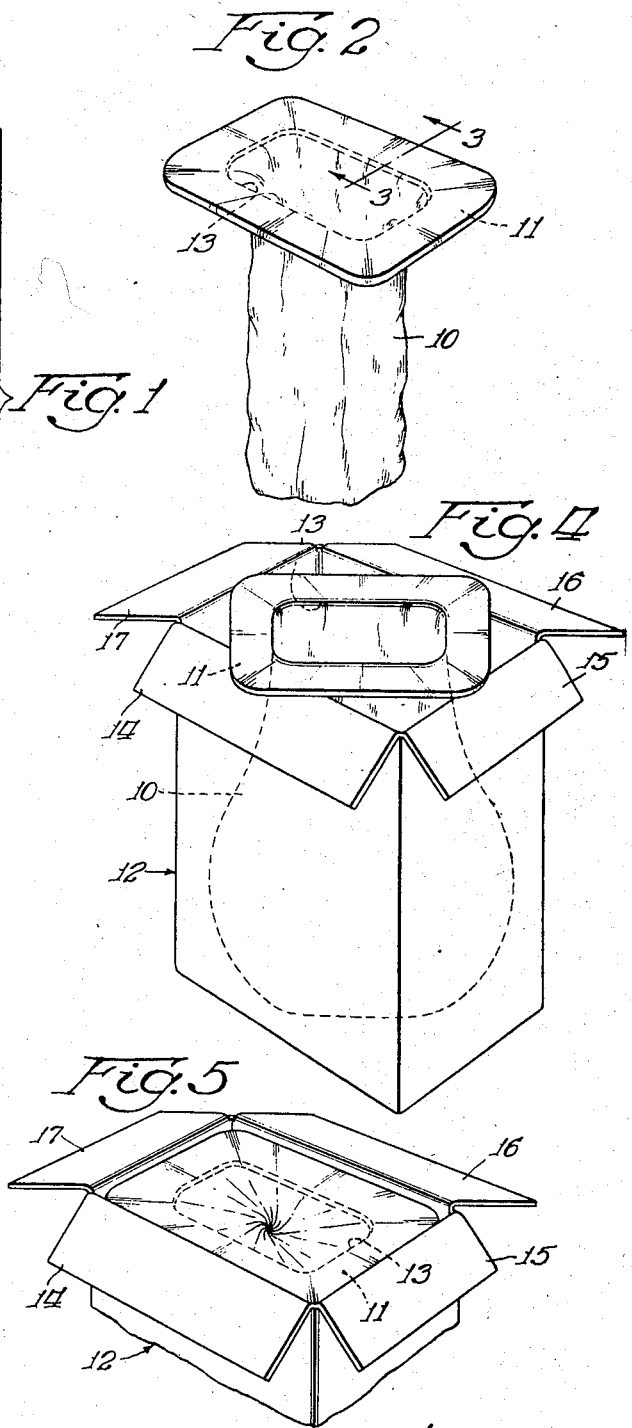
Inventor:
Richard R. Walton
By: E. A. Wagonseller
Atty.

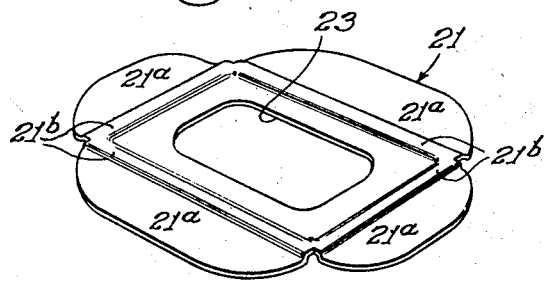
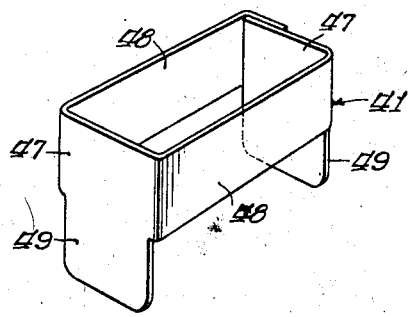
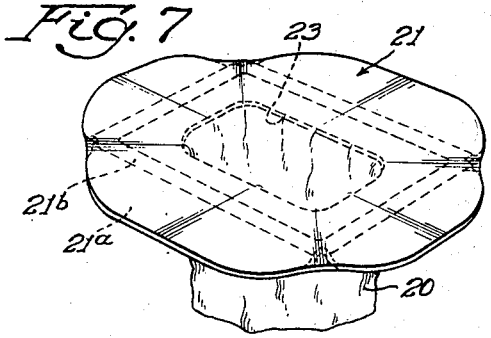
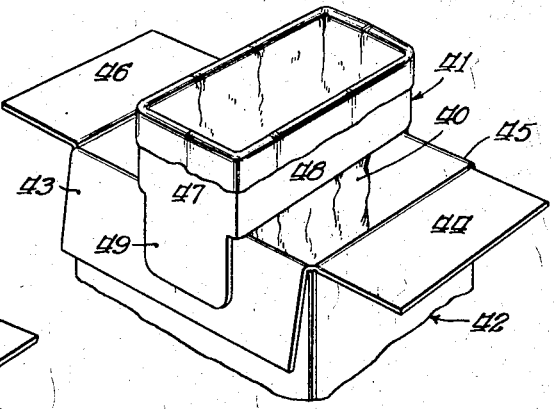
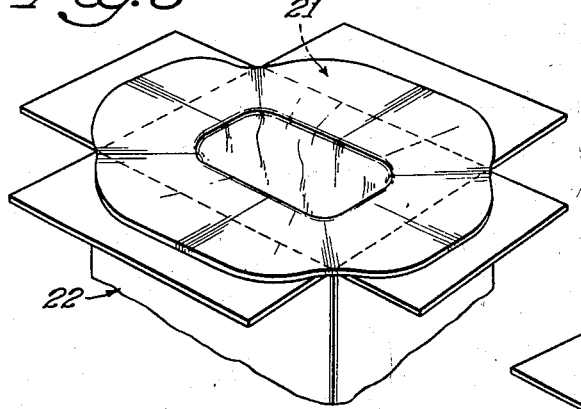
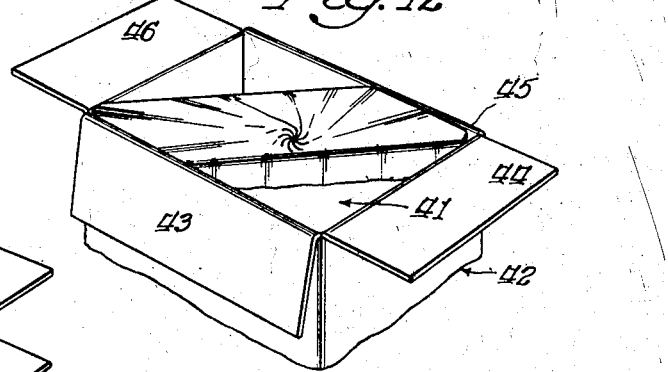
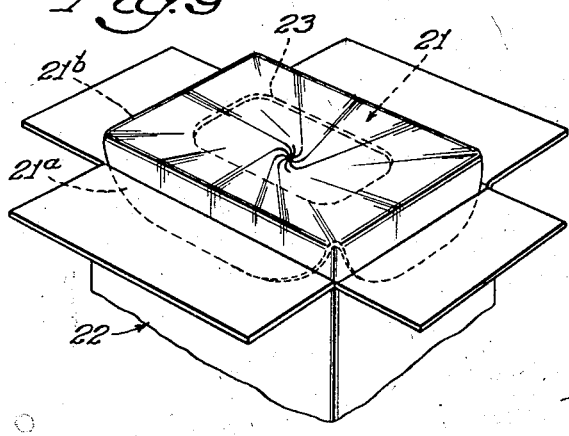
Inventor:
Richard R. Walton
By: E. A. Wagonseller
Atty.

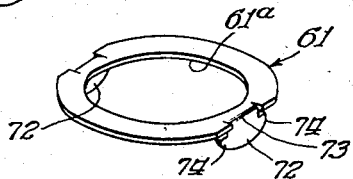
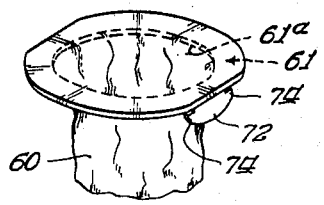
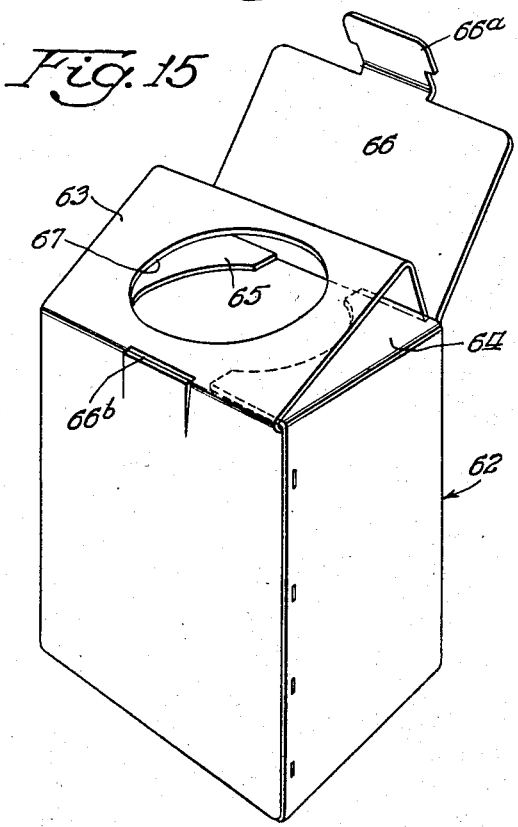
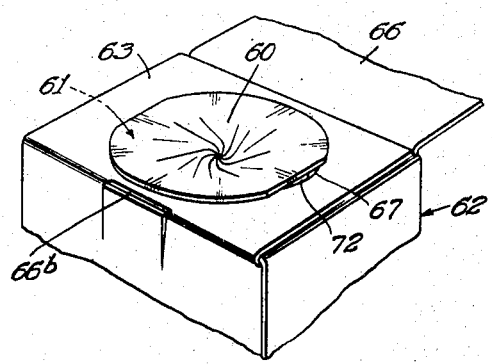
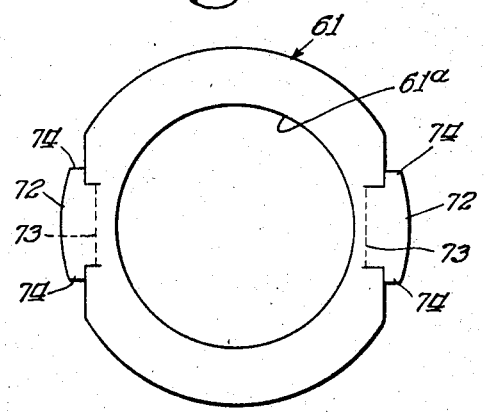

June 27, 1944. R. R. WALTON 2,352,503
CONTAINER
Filed April 16, 1941 7 Sheets-Sheet 4

Inventor:
Richard R. Walton
By: E. A. Wagonseller
Atty.

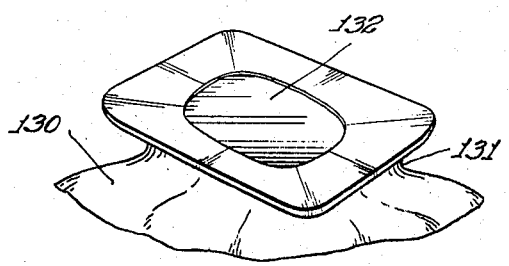
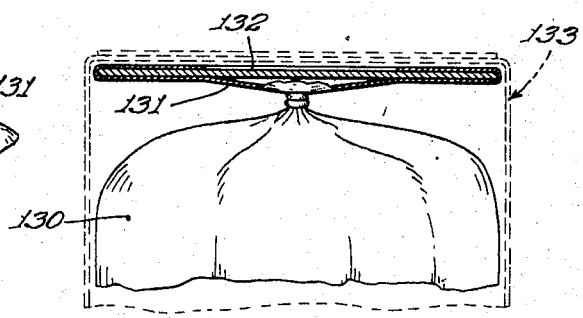
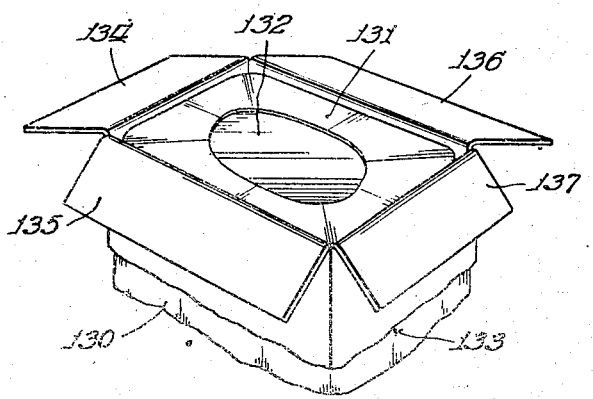

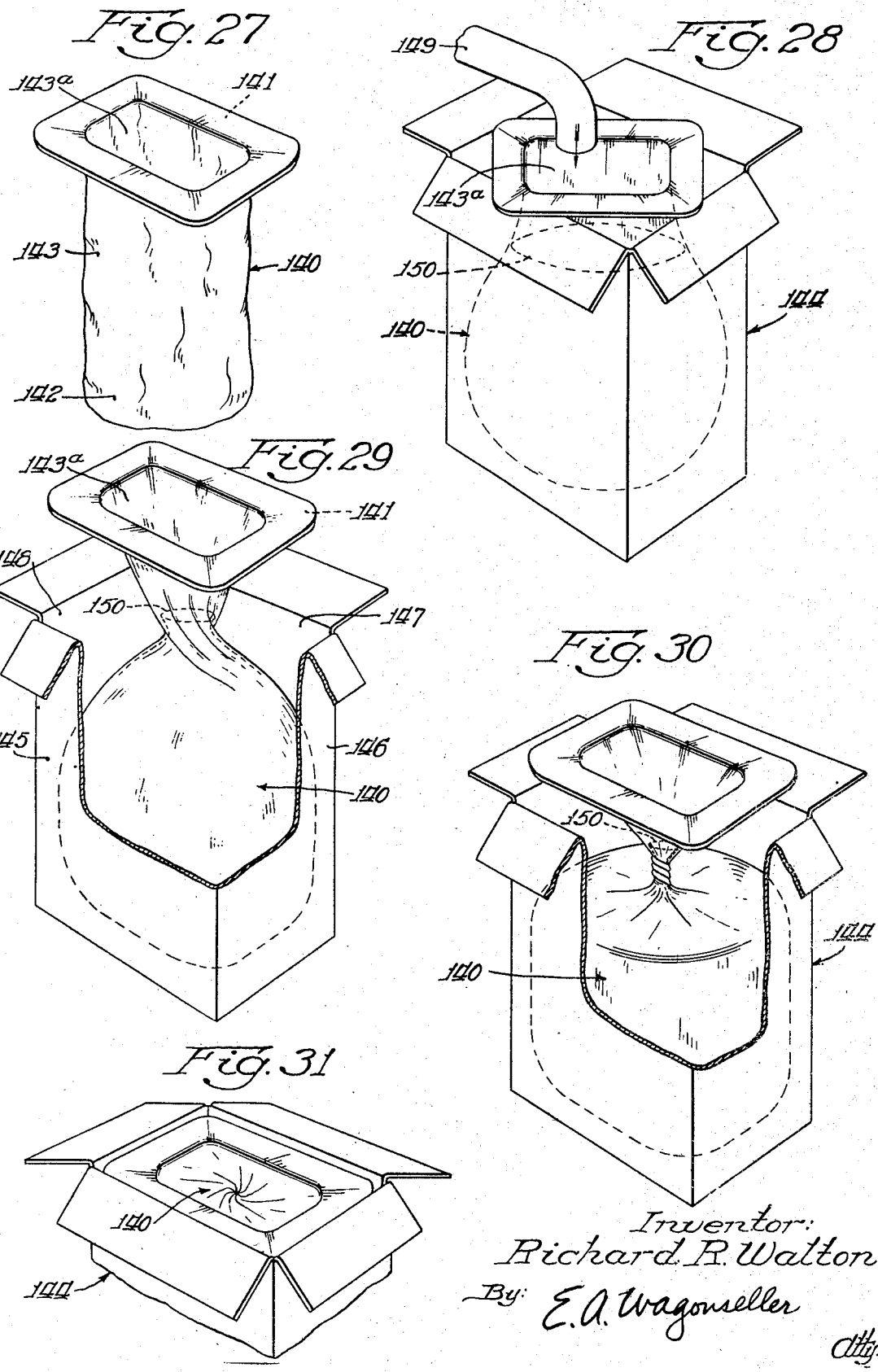

Inventor:
Richard R. Walton
By E. A. Wagonseller
Atty.

Patented June 27, 1944

2,352,503

UNITED STATES PATENT OFFICE 2,352,503

CONTAINER

Richard R. Walton, Wellesley, Mass., assignor of one-half to Container Corporation of America, Chicago, Ill., a corporation of Delaware, and one-half to Dewey & Almy Chemical Company, Cambridge, Mass., a corporation of Massachusetts Application April 16, 1941, Serial No. 388,787

25 Claims. (Cl. 229—14)

The present invention relates to containers and more particularly to collapsible containers for the retention and packaging of liquids, semi-liquids, relatively small solids, and the like. It also relates to an improved method of packaging the same using such containers.

One object of the present invention is to provide an improved container including a lining element therefor adapted for the effective retention of liquid, semi-liquid and small solid materials and the subsequent dispensing thereof.

Another object of the invention is to provide an effective form of lined container adapted to retain the contents thereof out of contact with air and to provide means for enabling a portion of the contents to be dispensed and the container effectively resealed to maintain the contents out of contact with air until further amounts of the contents of the container are required.

Another object of the invention is to provide a container including means for facilitating filling the container with liquid and other materials, such means also being effective for facilitating hermetic sealing of the contents.

Still another object is to provide an improved method of packaging perishable products, particularly such products as eggs, fruit juices, berries, vegetables and the like.

Additional and more specific objects of the invention will become apparent as the description proceeds.

In the drawings:

Figure 1 is a perspective view illustrating separated parts of a construction embodying the present invention comprising a container and inner packing elements;

Figure 2 is a perspective view illustrating the manner of associating a bag lining element and reinforcing rim;

Figure 3 is a fragmentary sectional, detailed view of the portion of the bag and rim element;

Figure 4 is a perspective view illustrating a container with assembled bag lining element therein, having the reinforcing rim supported on the edges of the container as in filling position;

Figure 5 is a fragmentary perspective view illustrating the manner of closing the container by twisting the neck of the bag and disposing the reinforcing rim element within the upper part of the container;

Figure 6 is a detailed perspective view showing a modified form of reinforcing rim element;

Figure 7 is a fragmentary perspective view showing a bag lining element having its upper portion associated with the rim illustrated in Figure 6;

Figure 8 is a fragmentary perspective view illustrating the manner of associating this form of rim and bag lining element with a container;

Figure 9 is a perspective view somewhat similar to Figure 8 illustrating the lining element as closed with the rim element partially inserted into the top part of the container;

Figure 10 is a perspective view of a third modified form of reinforcing rim element for the bag lining element;

Figure 11 is a fragmentary perspective view illustrating the manner of assembling the mouth of the bag with the rim element and resting the latter upon the edges of the container preparatory of filling the bag;

Figure 12 is a fragmentary perspective view illustrating the bag in closed condition with the rim element disposed within the upper portion of the container;

Figure 13 is a perspective view of a fourth modified form of reinforcing rim element;

Figure 14 is a perspective view of a bag lining element associated with this form of rim element;

Figure 15 is a perspective view of a container constructed to cooperate with the assembled rim and bag elements illustrated in Figure 14;

Figure 16 is a fragmentary perspective view of a container constructed as illustrated in Figure 15 and having an assembled rim and bag element associated therewith;

Figure 17 is a plan view of the blank of the rim element illustrated in Figure 13;

Figure 24 is a fragmentary perspective view illustrating an eighth modified form of the invention in which an imperforate sheet member is held within the mouth of the bag to close the same completely;

Figure 25 is a fragmentary sectional view illustrating the manner of associating the bag and closure element illustrated in Figure 24 within an enclosing container;

Figure 26 is a perspective view illustrating the same bag and closure element within a container before the container has been closed by the closure flaps carried thereby;

Figures 27 to 31, inclusive, are views illustrating various steps in a method of utilizing bags and containers of the form illustrated in Figures 1 to 5, inclusive.

Figure 32:
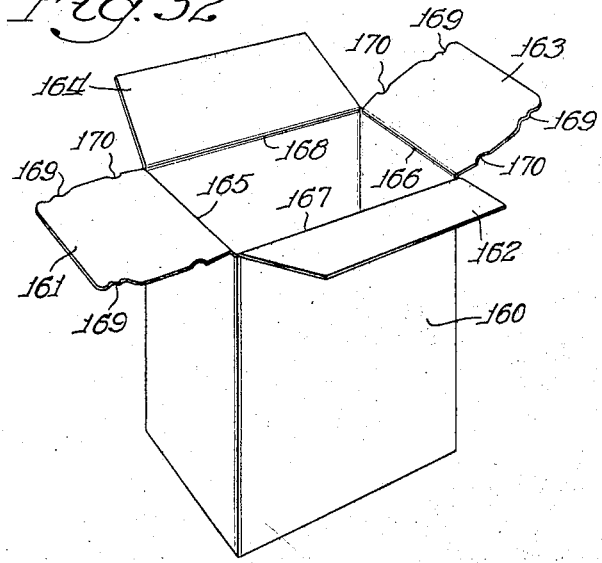
Figure 33:
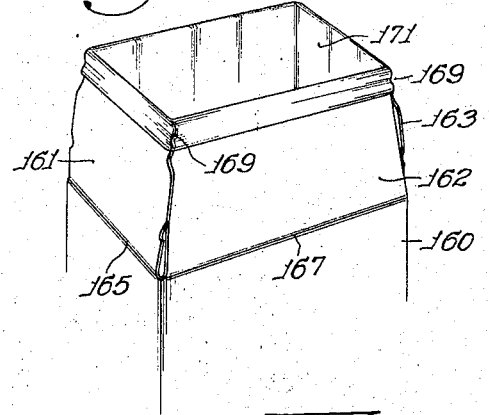
Figure 34:
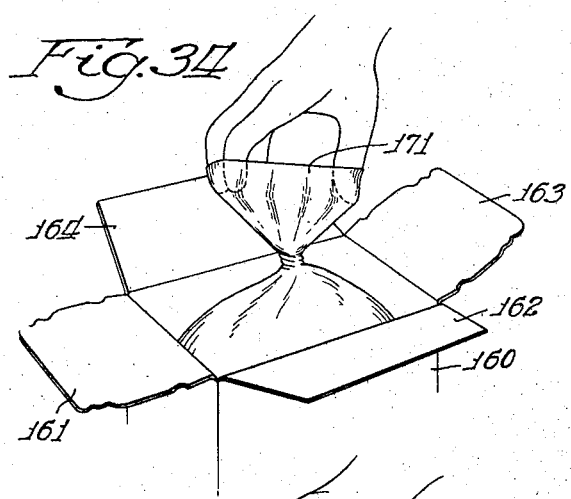
Figure 35:
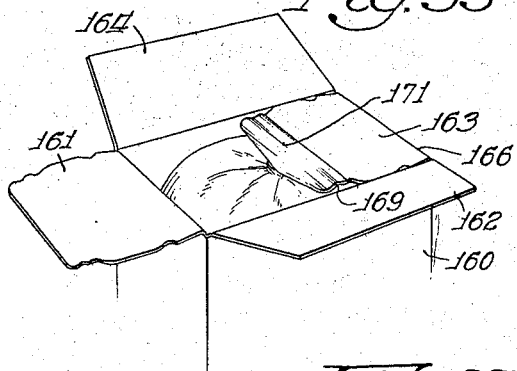
Figure 36:
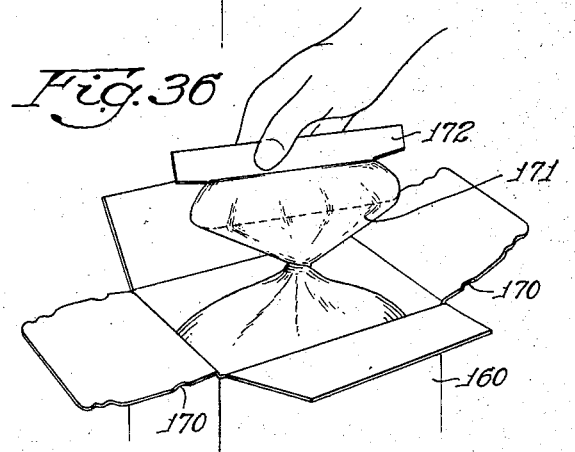
Figure 37:
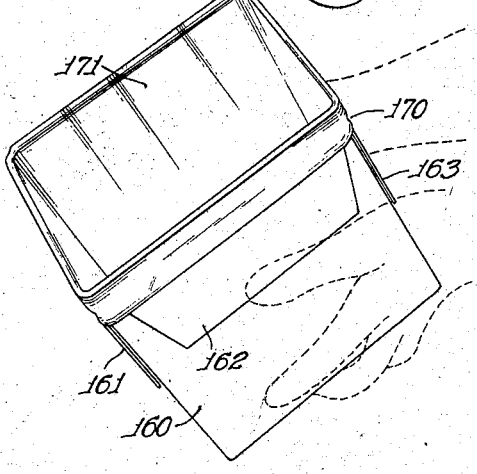

Figure 32 is a perspective view of a modified form of container according to the present invention;

Figure 33 is a fragmentary perspective view illustrating the manner in which a bag such as shown in Figure 1 is stretched over the top flaps of the container of Figure 32 for filling;

Figure 34 is a fragmentary perspective view illustrating one method of sealing the filled bag;

Figure 35 is a fragmentary perspective view illustrating a preferred manner of maintaining the seal obtained as shown in Figure 34;

Figure 36 is a fragmentary perspective view showing an alternative method of sealing the bag; and Figure 37 is a fragmentary perspective view illustrating a preferred manner of removing material from the bag.

The present invention, as herein disclosed, provides a container adapted for the retention, shipment and storage of perishable commodities, and particularly liquid or fluent materials such as eggs, fruit juices, berries in syrup, and for relatively samll solids such as cherries, sliced peaches or apples, peas, lima beans, cut corn, blueberries, etc., which it is desired to preserve in a frozen condition. The container comprises essentially a carton which may, for example, be of relatively heavy paperboard material and an inner bag of a flexible material which is substantially impervious to liquids and water vapor and is preferably elastic, means being provided for preventing the upper portion or mouth of this bag from moving or untwisting with respect to the carton after the bag has been filled. The invention also includes the improved method of packaging commodities employing this type of container.

In one of its forms the means for holding the mouth of the bag in position after filling is a collar or reinforcing element for the upper edge or mouth of the flexible bag which enables the mouth of the bag to be held in a distended condition and which can be readily grasped by the fingers of the operator. By turning this collar, the mouth of the bag can be closed by twisting after the fluent or other materials have been introduced into the bag to provide a hermetically sealed container, and can be opened again for dispensing all or a part of the contents. When only a part of the contents have been removed, simple turning of the collar will again produce a seal to protect the remaining material.

Referring more particularly to the drawings, there is indicated at Figure 1 a bag 10 having a collar element 11 associated therewith. The bag 10 comprises a body, neck and mouth portions and is preferably of more or less tubular form and can be formed of flexible material.

The collar 11 will preferably be made to conform to the interior dimension of a carton 12 which is to be employed to retain the bag 10 after filling. In the present instance the carton 12 is shown of elongated, rectangular shape and the collar will preferably be of similar shape and capable of fitting within the top of the carton as illustrated in Figure 5.

For the purpose of associating the bag and the collar the preferred sequence of steps is to stretch the mouth of the bag over the collar and then pass the bag down through the opening 13, as illustrated in Figure 2. The bag, while in empty condition, may be placed within the carton 12 with the collar 11 resting on the upper edges of the walls of the carton, as illustrated in Figure 4. The bag, in this position with the mouth portion distended, is now ready to receive the contents which may be introduced in any well-known manner by filling machinery or by hand. After a proper amount of material has been introduced into the bag, the collar element 11 will preferably be turned several times to twist the bag neck as illustrated in Figure 5. This will seal the contents of the bag and keep the contents from contact with air. The contents of the bag can then be frozen and the carton may then be closed by the closure flaps 14, 15, 16 and 17.

If desired, the bag may be filled with material after which it is supported in a form and the contents may be frozen in this form with the collar in twisted condition so that it is ready to be inserted into a carton. All that is necessary then is to seal the carton and the package is ready for shipment.

When it is desired to use the material in the carton, this may conveniently be done by opening up the flaps and thawing the contents of the bag, then, by raising the collar 11 so that it will be removed from the top of the carton, it is turned to untwist the neck of the bag, then deposited, as illustrated in Figure 4, on the side walls of the carton. In this position it is possible to pour out the desired amount of the contents and when no more of the content of the bag is required, the bag is then sealed by again turning the collar to twist the bag neck and the carton may then be closed and placed in a refrigerator so as to keep the material in a cool condition until more is needed.

In the form of the invention illustrated in Figures 6, 7, 8 and 9, a bag 20 is provided, similar to the bag 10 and a collar element 21 is secured to the mouth of the bag in a manner similar to that previously described, that is by stretching the mouth of the bag around the edges of the collar element and allowing the body of the bag to extend down through the opening 23 of the collar. The carton 22 employed with this bag and collar assembly is preferably of elongated rectangular form. The collar is preferably of generally oval form and is provided with foldable elements in the form of flaps 21a which are defined from the main portion of the collar by score lines 21b. The score lines 21b define a shape substantially conforming with the interior of the container 22 so that when the flaps 21a are turned at right angles with relation to the collar element it is possible to insert the collar element into the carton and the collar will be held from rotational movement. Thus, as explained above, when the bag has been filled with a liquid or other commodity it can be closed by rotating the collar element to twist the neck of the bag, then upon the flaps being folded downward, as illustrated in Figure 9, the collar may be inserted into the carton.

It is apparent that when using a construction illustrated in Figures 6 to 9, inclusive, it is not necessary to exercise care to place the collar in a particular manner across the mouth of the carton when it is desired to introduce material into the bag. The collar, being provided with the flaps 21a, will rest upon the top of the container in any position in which the collar is applied to the container. It is not necessary that the carton in the present instance be elongated in plan, it being only necessary that the narrow dimension is not greatly in excess of the distance between opposite fold lines 21b. When it is desired to dispense a portion of the contents in this form of the invention the collar is lifted to allow it to be turned to untwist the neck of the bag and the collar may then be reinserted into the open top of the carton, after which the contents of the bag may be poured out or as much thereof as desired. Due to the construction of the collar, including the flaps 21a, it is possible to obtain a somewhat more firm retention of the collar in place within the upper part of the carton than is the case with respect to the collar illustrated in Figures 1 to 5 inclusive.

In the form of the invention illustrated in Figures 10, 11 and 12, a bag 40 is provided having a collar element 41 secured to its mouth by stretching the mouth of the bag over the collar element in a manner similar to that previously described. The carton 42 is preferably of elongated, rectangular shape and is provided with closure flaps 43, 44, 45 and 46.

The collar element 41 is preferably in the form of a parallelogram having side portions 48, 48 of a length sufficient to bridge across the narrow dimension of the carton. The side portions 47, 47 are preferably provided with flap extensions 49, 49, respectively, projecting downwardly so that when the collar has been placed in position to bridge across the narrow dimension of the carton, as illustrated in Figure 11, the flap portion 49 will tend to retain the down-turned flaps 43 and 45 against or adjacent the outer surfaces of their attached side walls. While in this position the bag may be filled with material or the material may be dispensed from the bag. After filling the bag with the desired amount of material, the collar can be somewhat raised to clear the upper edges of the carton side walls, then turned to twist the neck of the bag and protect the contents from air, after which the collar may be reinserted into the carton as illustrated in Figure 12. For this purpose the collar is altered from a rectangular shape to diamond shape so that the distance between the sides 47, 47 will be decreased to permit the collar to fit the interior of the carton.

To facilitate hinging movement of the side portions of the collar with respect to each other, the collar is preferably formed of a strip of folding carton board having the ends thereof overlapping and secured together, the strip being scored to provide hinging lines defining the side portions from each other.

The flaps 49, 49 are also preferably hingedly related to their attached side portions 47, 47. The flaps may thus be swung upwardly to clear the upper edges of the side walls when it is desired to turn the collar for the purpose of twisting the neck of the bag. It is thus apparent that the collar does not need to be lifted more than a small amount to enable it to be turned with respect to the carton and the bag therein.

In forming the collar 41 it is sufficient to have two of the side portions of a length to bridge across the narrow dimension of the carton. The other two side portions of the collar can be of any convenient length so as to cause the mouth of the bag to be sufficiently distended for filling and dispensing purposes.

After the collar portion has been turned to twist the neck of the bag and the collar thereafter inserted within the top portion of the carton, as illustrated in Fig. 12, the carton is then ready to be closed by folding in and sealing the closure flaps in any well known manner.

In the form of the invention illustrated in Figures 13 to 17 inclusive, a bag 60 is provided having a collar element 61 secured to its mouth by stretching the mouth of the bag over the collar element in a manner similar to that previously described. The carton 62 may be of any desired shape, being herein illustrated as rectangular in plan. The carton is preferably formed with overlapping closure flaps 63, 64, 65 and 66. The flap 63 is preferably apertured at 67 to receive the mouth of the bag 60, the flaps 64 and 65 are short flaps attached to two opposite side walls, and have their free edge portions shaped to conform to the shape of the aperture in the flap 63, and the flap 66 is an outer closure flap preferably conforming in size and shape to the upper end of the carton to completely close the aperture 67.

The collar 61 is preferably of such size and shape as to lie within the contour of the closure flaps of the carton when the collar is in place, as illustrated in Figure 16. In the present instance the collar is shown as generally circular in form and is provided with an aperture 61a. For the purpose of locking the collar 61 with respect to the apertured flap 63, there are provided two locking tabs 72, 72 hingedly connected at 73 on the collar by means of a score line formed in the collar and having laterally projecting portions 74, 74 so that the tabs 72 will have a T-formation. The arrangement is such that when the tabs 72 are swung downwardly to a substantially right-angular position with respect to the collar 61, the tabs will enter the aperture 67 in the flap 63 and, when released, the projecting portions 74 will engage the underlying edge portions of the material around the aperture 67. By this construction the collar is retained against separation from the apertured flap 63 and is frictionally maintained against rotating movement with respect to the carton but this frictional retention is not sufficiently strong to prevent intentional rotation of the collar when it is desired to twist the neck of the bag in closing the bag or, conversely, to untwist the neck of the bag when it is desired to dispense a portion or all of the contents.

As indicated above, the bag is assembled to the collar by stretching the mouth of the bag over the collar and this is preferably done while the tabs 72, 72 are in a downwardly displaced condition so that the edges of the bag that engage on the under side of the collar will not engage the tabs. Thus, the tabs are free to be swung into and out of engaging relationship with the edge portions of the aperture 67. After the collar and the bag have been assembled the body of the bag may be introduced into the carton through the aperture 67 with the main portions of the collar resting upon the edge portions of the flap around the aperture and the extensions 74 on the tabs engage with the under side of the edge portions around the aperture. The bag is now ready to be filled and, after filling, the collar 61 is rotated to twist the neck of the bag to close it. Due to the frictional relationship of the collar with the apertured flap, untwisting of the neck of the bag will be resisted. Subsequent securing of the flap 66 over the collar 61 will still further increase the resistance to rotary movement of the collar and thus maintain the bag in closed condition during shipment and storage. The flap 66 may be held in closed position in any suitable way, such as by means of a strip of gummed tape. In the present instance the flap 66 is provided with a locking tongue 66a adapted to be inserted, for locking engagement with the hinge portion of flap 63, by inserting it into the slot 66b formed along the hinge line between the flap 63 and the carton side wall to which flap 63 is attached.

Figure 18:
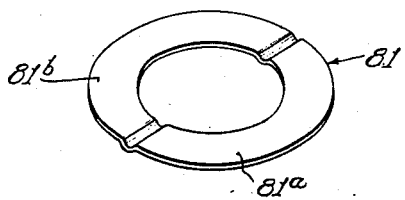
Figure 18 is a perspective view of a fifth modified form of reinforcing rim element.
Figure 19:
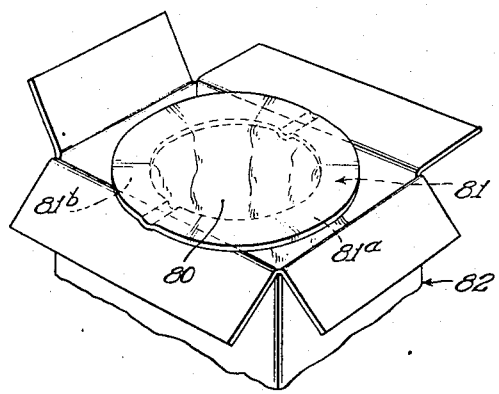
Figure 19 is a fragmentary perspective view illustrating the manner of associating this form of rim and bag lining element with a container.
Figure 20:
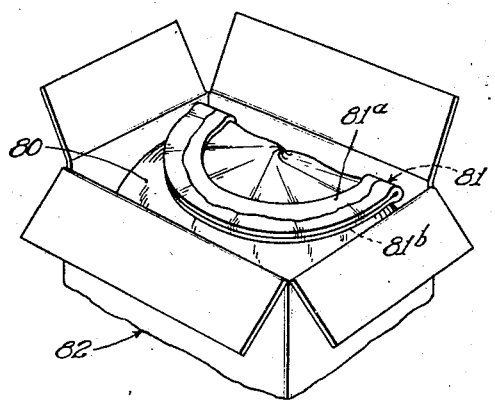
Figure 20 is a fragmentary perspective view illustrating a filled bag which has been closed and having the rim element folded and disposed within the upper part of the container.

In the form of the invention, illustrated in Figures 18, 19 and 20, a bag 80 is provided with a collar 81 comprising two hingedly related, segmental portions 81a and 81b. As in the previously described forms, the mouth of the bag is stretched over the collar so that it will be retained in distended condition. The collar is of such size as to bridge across the container, at least across its narrow dimension. The carton 82 is herein illustrated as having an elongated, rectangular shape with the greater dimension somewhat in excess of the diameter of the collar 81. When it is desired to fill the container with liquid or other material the body of the bag will be deposited within the carton in position so that the hinge lines of the collar will extend transversely across the carton. In this position there will be no tendency for the collar to drop into the container even though the tension of the elastic bag on the collar has the effect of tending to collapse the collar. The bag is then ready to be filled. After filling the bag it is closed or collapsed by moving the segments 81a and 81b into facial contact and then rotating the collapsed collar to twist the neck of the bag. This form of collar is convenient for such purpose for the reason that the twisting may be done manually with the fingers of one hand. After closing the neck of the bag the collar, while in collapsed form, will be positioned flatwise on top of the bag and within the mouth of the carton so that subsequent closing of the carton by turning in the closure flaps will retain the collar in this position.

It is to be noted that either of the segmental portions of the collar will serve to keep the mouth of the bag distended and to facilitate twisting of the neck portion so that, if desired, one of the segmental portions can be dispensed with.

Figure 21:
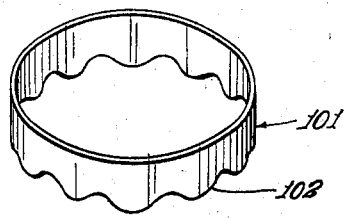
Figure 21 is a perspective view of a sixth modified form of reinforcing rim element.
Figure 22:
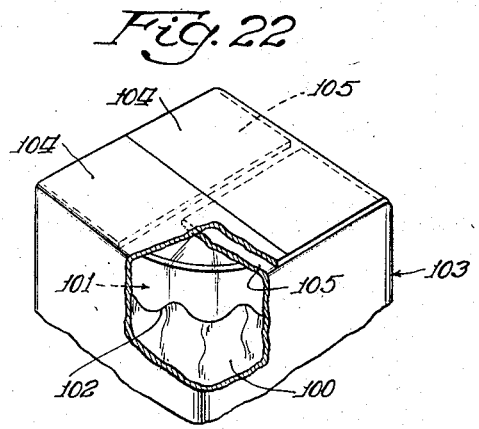
Figure 22 is a fragmentary perspective view, with certain parts shown in section, illustrating the rim element of Figure 21 in place within the upper part of a container.

In the form of the invention illustrated in Figures 21 and 22, a bag 100 is provided having a collar 101 which is preferably of circular form and has a lower edge portion 102 having a wavy conformation. The carton 103 employed with this type of collar is preferably square in plan and has closure flaps 104, 104 and 105, 105. This form of invention is advantageously employed when it is desired to package liquids which are to be frozen in the bag before the introduction of the filled bag into the carton. The bag is preferably filled in a suitable supporting form after which the collar is turned to twist the neck with respect to the body of the bag, the relation of parts being such that the wavy edge portion of the collar will be somewhat imbedded in the upper shoulder portions of the bag. In this way the engagement of the collar and shoulder portions of the bag will prevent untwisting of the collar, and subsequent freezing of the liquid inside the bag will cause a permanent retention of the collar with respect to the bag until the contents have been thawed.

In some instances it is also desirable to select a size of collar which will frictionally fit against the inside surfaces of the carton when the collar has been inserted therewithin. By so doing, the rotation of the collar to untwist the neck of the bag will be resisted. If desired, the shape of the collar may be as described without the provision of the wavy conformation on the lower edge of the collar.

Figure 23:
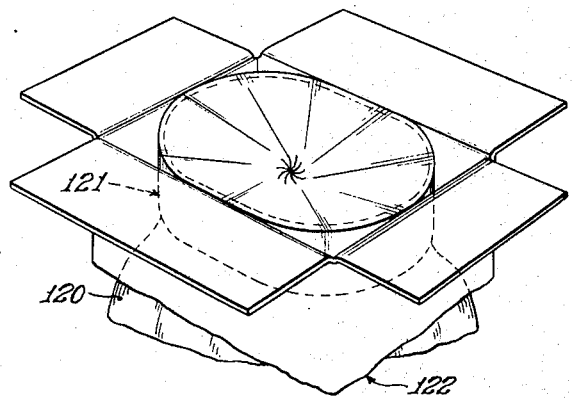
Figure 23 is a fragmentary perspective view illustrating a seventh modified form of reinforcing rim element assembled with a bag lining element which has been filled, the rim element having been disposed within the upper part of a container.

In the form of the invention illustrated in Figure 23, a bag 120 is provided having a collar 121 secured to the bag in a similar manner to that previously described. The bag, when filled, is adapted to be inserted into a carton 122 of elongated, rectangular form in plan. The collar 121 is of such size that, when in rounded form, its diameter is sufficient to cause the collar to bridge the narrow dimension of the carton. In this position, the collar will be supported on the upper edges of the side walls of the carton for the purpose of enabling the bag to be filled. After filling the bag and turning the collar to twist the neck of the bag, the collar may be inserted within the top part of the container by distorting it to oval form. The long dimension of the carton will, of course, be sufficient to accommodate the collar in its elongated condition. Due to this construction, the collar will be frictionally held within the top part of the carton which will prevent the neck of the bag from becoming untwisted. When it is desired to dispense all or a portion of the contents of the container, the collar is removed from the upper part of the carton, turned to untwist the neck and the collar is then allowed to rest on the edges of the carton side walls in which condition the contents may readily be dispensed.

Instead of the use of a rectangular shaped container a round or cylindrical shape may be employed, and, as stated above, a collar of such size as to frictionally fit within the interior of the container is selected to prevent the neck from untwisting and also to insure the retention of the collar in place within the container when it is desired to dispense the contents of the bag. In such forms of collar and container, the collar could be adhesively secured to the container walls after the neck of the bag was sealed by twisting, and when it is desired to dispense the contents of the bag, the bag could be opened by slitting the same in the manner referred to above.

In the form of the invention illustrated in Figures 24, 25 and 26 a bag 130 is provided having neck portion 131 within which a closure element 132 is adapted to be secured. The closure element 132 is selected of such size as to fit within the upper end of the container 133 herein shown as provided with closure flaps 134, 135, 136 and 137.

After filling the bag 130, the closure 132 is inserted within the mouth or neck portion of the bag in any suitable way. This may conveniently be done by providing a filling funnel having a neck portion shaped to conform to the closure 132 and made sufficiently large so that the closure may pass through the funnel and into the neck of the bag after it has been filled; thus, the mouth of the bag will grasp around the edges of the closure and the closure will thus be held in a closed position. By further twisting the neck of the bag as illustrated in Figure 25, the bag may be thus sealed by the twist and when the closure is in position within the upper part of the container, untwisting of the neck will be prevented.

This form of invention is useful in instances in which the user follows the practice of cutting a hole in the side or bottom portions of the bag to dispense all of the contents at one time, it being unnecessary to provide a dispensing and reclosing opening as in the case of the other described modified forms.

From the foregoing description it is apparent there is provided an effective arrangement for the shipment and retention of liquids within paperboard cartons without requiring special treatment of the carton to render it liquid tight, there being provided, in lieu of specially treating the carton, a light, inexpensive, flexible bag or other flexible lining means serving as the immediate container for the liquid or other material. If it is desired to use the entire contents at once, the side or bottom of the bag may be cut to form an opening therein or, in the event the bag is provided with a reinforcing rim member in the neck of the bag, such rim member can be manipulated to untwist the neck so that part of the contents will be dispensed, after which the neck may be again twisted to hermetically seal the remainder of the contents within the bag.

The constructions of containers herein described are particularly advantageous for use in connection with the storage and shipment of relatively large individual quantities of liquid products such as eggs in fluid form after removal from the shell, fruit juices and other liquid products which are found desirable to be packed in quantities ten to one hundred pounds or more for use in bakeries, restaurants and other commercial establishments.

Referring to Figures 27 to 31, inclusive, illustrating a method of employing flexible bags and containers to provide hermetically sealed packages according to the invention, an elastic bag 140 is secured to a collar 141, as previously described, in connection with Figures 1, 2 and 3. For purposes of completeness of description of this form of the invention, the bag is considered as comprising three principal parts, namely, a material-retaining portion 142, an elongated neck portion 143 and a mouth portion 143a. The bag is illustrated as being in the form of a straight, closed-end tube but the principle is unchanged if it is desired to employ bags with a somewhat constricted neck portion. The use of the particular form of collar element 141 to hold the mouth of the bag in dilated condition is to be considered for purposes of illustration only as it is within the scope of the invention, so far as the method of filling of the bag is concerned, to employ other means for holding the mouth of the bag open.

After the bag has been secured to the collar 141, as illustrated in Figure 27, it is then transferred to a container 144 which is illustrated as being of the same type as shown in Figures 1, 4 and 5, and comprises side walls 145, 146, 147 and 148.

After the bag, with collar attached, has been assembled with the container 144 with the collar resting upon the upper edges of the container walls, the assembly is then ready for filling and may be filled from any convenient source of material supply through pipe or nozzle indicated at 149. The material, herein for convenience referred to as liquid, is indicated at 150 and, in practice, a substantially predetermined amount of liquid will be filled into the bag. The size of the container 144 and the bag 140 will preferably be so selected that, when the predetermined amount of liquid has been introduced into the bag, the level of the liquid will rise to a point which is a short distance below the upper edges of the container, the liquid level being indicated by dotted lines 150 in Figure 28.

When the bag has been filled with the required amount of liquid, the next step is to close the bag in such manner as to exclude substantially all excess air, that is, it is desirable to exclude all air from the bag between the level of the liquid and the point of sealing. For this purpose the mouth portion of the bag is pulled upwardly, as indicated in Figure 29, causing the neck portion 143 to stretch and causing the liquid level 150 in the bag to rise somewhat above the level shown in Figure 28. While the neck portion 143 is maintained in a stretched condition with the liquid level raised, the neck will be given an initial twisting by turning the mouth portion of the bag and the operator, by carefully controlling the stretching of the neck and the twisting of the bag, can cause complete collapse of the neck portion at a point substantially at the level of the liquid in the bag. The action of turning the mouth portion is then continued sufficiently to insure that when the external force is relieved from the mouth portion of the bag, the twist in the neck portion will continue to retain the bag in sealed condition. In practice, the mouth portion will be given almost one complete turn before the operator is required to exercise care in controlling the neck portion, as above stated, to close the twist at the liquid level and, after the twist has closed the neck, the operator preferably gives the neck portion an additional complete rotation to assure the maintenance of a seal when the stretching force on the neck is released. Figure 30 illustrates the condition of the bag after completion of the seal and before tension on the mouth portion has been released.

After the bag has been filled and sealed, as above described, the collar 141 will be fitted into the upper part of the container 144 as shown in Figure 31. Due to the relationship between the collar and the side walls of the container, untwisting of the neck of the bag will be prevented.

The container is then ready to be closed for shipment or, if desired, the container may be left open for freezing the contents after which it may be closed to condition it for shipment.

In certain cases the liquid level 150 may be caused to rise above the point of twist in the neck portion, thereby causing a small portion of the body of the liquid to be left above the twist. This insures the exclusion of substantially all readily excludable air since the twist occurs within the body of the liquid. The small excess of liquid above the point of twist will be discarded by tipping or inverting the bag after completing the twist.

If it is desired to employ in this process bags which are nonelastic, this may be accomplished by filling the bag as indicated in Figure 28 and by lifting and twisting the mouth portion and at the same time flexing the side walls inwardly to cause the liquid level to rise to substantially the point at where the twist occurs in the neck. The remaining operations may be carried out in substantially the same manner as above described.

Although the invention has been hereinabove described in connection with a collar or similar device for facilitating filling and twisting of the flexible bag, it is not necessary that such a device be employed and a preferred form of the invention will now be described in detail which does not require a collar element and is exceptionally easy to use on a large scale.

Referring to Figures 32 to 37, inclusive, illustrating this preferred container and the method of employing it, a carton 160 of fibreboard or the like, which may suitably be a solid fibre carton coated with a waterproofing composition, is selected, and set up by any suitable bottom closure means. As shown in Figure 32, carton 160 is of elongated rectangular shape having top closure flaps 161, 162, 163 and 164, flaps 161 and 163 being integral with the end walls but set off therefrom by score lines 165 and 166, respectively, and flaps 162 and 164 being integral with the side walls and set off therefrom by score lines 167 and 168. Flaps 162 and 164 are used to effect the closure of the carton and so may be equipped with any suitable type of lock, but as shown they are simple overlapping flaps adapted to be secured by stapling, gluing or other conventional means.

Carton 160 can be of the simple slotted type in which the flaps 161, 162, 163 and 164 are substantially rectangular in shape, but certain additional advantages are obtained by using the die cut carton shown in Figures 32 to 37, inclusive, and the description of the invention will proceed with reference thereto, although the invention is not so limited. It is preferred, therefore, that the side edges of flaps 162 and 164 should have a slight taper and that the length or height of these flaps should be approximately the same as that of flaps 161 and 163, for reasons which will be explained below. If this is impractical because of the locking arrangements or for any other reason, the flaps 162 and 164 can be somewhat longer than flaps 161 and 163 if their outer corners are properly rounded so as to give a smooth upper edge when the flaps 161, 162, 163 and 164 are in the position shown in Figure 33.

Flaps 161 and 163 are provided with two sets of notches on their side edges, the notches 169 being relatively close to the end of each of said flaps and the notches 170 being relatively close to their respective end walls. These flaps are adapted to underlie flaps 162 and 164, and preferably have equal lengths or heights such that when folded toward each other, their extremities do not meet but leave a small slit extending across the carton.

Proceeding now to the method of my invention, a bag 171 of liquid-tight flexible material similar to the bag 10 shown in Figure 1 is inserted into carton 160 with its top or mouth portion stretched over the ends of flaps 161, 162, 163 and 164 and engaged in the notches 169 as illustrated in Figure 33. In order to accomplish this, carton 160 is held in upright position by a template or the like (not shown), flaps 162 and 164 are inclined slightly inward, flaps 161 and 163 are urged inward against the lateral edges of flaps 162 and 164, and stretching the top of bag 171 over the thus exposed notches 169 while allowing the body portion thereof to occupy carton 160. It will be understood that up to this point score lines 165, 166, 167 and 168 will not have been broken, the flaps 161, 162, 163 and 164 being in the position shown in Figure 32 merely for the purpose of better illustrating the form of the carton 160. Furthermore the notches 169 are not absolutely essential but may be omitted.

The bag 171 is now ready for filling, and this can be done in the conventional manner. Liquid and other fluent materials will generally be introduced at ordinary temperatures, but relatively small solid commodities, such as peas, lima beans, etc. are preferably loose frozen by a fast freezing process and then poured into the bag 171. One of the great advantages of the present method is the large filling opening provided thereby and the substantial elimination of any way for the material being packaged from gaining access to the space between carton 160 and bag 171.

The top of bag 171 is then disengaged from notches 169, the flap 161, 162, 163 and 164 are bent outwardly and the upper portion of the bag is twisted at least two turns under controlled tension as hereinabove described to cause the seal to occur at a point at which substantially all excess air is excluded from the interior of the bag. The simplest method of accomplishing this is for the operator to place his hand in the bag opening as shown in Figure 34, raise it to attain the proper liquid level, and rotate the carton to produce the twisted air-tight seal. Then the mouth of bag 171 is stretched over the end of either flap 161 or flap 163, which has been bent inwardly for the purpose, so that it is engaged by notches 169 thereon and the seal is maintained. As illustrated in Figure 35 the top of bag 171 is stretched over flap 163, and flaps 161, 162 and 164 are then folded inwardly and locked or sealed in any suitable manner. A package is thus obtained which, if kept under the proper temperature conditions, will maintain its contents in perfect condition throughout the subsequent freezing operation, if any, shipment and storage.

It will be noted that in the form of the invention just described, the notches 169 serve a dual function, viz. they hold the bag 171 in filling position and also serve to secure the twisted seal against untwisting. The configuration of the flaps 161 and 163 is also such that the top of the bag 171 cannot be ruptured by chafing against the side walls of the carton, and the slit between the ends of flaps 161 and 163 previously mentioned provides space for the bag to enter the body of the carton without danger of chafing. While it is preferred to use flaps 161 and 163 provided with notches as described, they can be merely given a slightly tapered form, and most of the advantages of the invention will be retained if they are substantially rectangular in shape.

Figure 36 illustrates a variation of the above described procedure especially applicable to the larger sizes of cartons in which a key 172 of paperboard or the like is inserted in the mouth of the bag in place of the hand of the operator after filling and is twisted to provide the air-tight seal. The key 172 is preferably of a length greater than the width of carton 160 so that it can be placed in the carton resting on bag 171 and the twisted seal will remain in position. Alternatively, however, the top of bag 171 can be removed from key 172 after twisting and stretched over the notches 169 in flap 161 or flap 163 as hereinabove described.

Liquids, when frozen, form a rigid mass inside the package. Thus, after freezing, the package possesses an abnormally high crush resistance and may be stacked to considerable heights without danger of bulging the lowermost tier. Loose, fluent material lacks the property of consolidating into a rigid mass, but I have found that if, after filling the flexible and impermeable bag with loose material, the particles of which are relatively rigid (loose frozen peas will serve as an example), the package is vibrated and air is removed from its interior, a package is produced which has high crush resistance. Air may be removed, for example, by gathering the neck of the bag 171 against a vacuum pipe.

As a result of the combined effect of vibration, removal of the air and the constricting force upon the particles due to external air pressure working through the walls of the bag, the particles are brought into and maintained in close-packed condition. Hermetically sealing the neck of the bag maintains this close-packed, rigid condition permanently. Further if the bag be elastic as well as flexible and impervious, filling the bag with sufficient material to stretch the elastic walls and vibrating will be enough and no air exhausting step will be necessary, for the contractile force of the bag then takes the place of the pressure differential between the inside and outside of the bag. Hermetic sealing may be secured in the manner already described. Exhausting the air is, however, preferred because this step, particularly in the case of foods, materially lessens the possibility of oxidation of the contents.

When the contents have been forced into and maintained in close-packed condition, the rigidity is practically equivalent to a solid mass. Such packages of loose solid material have, therefore, about the same resistance to crushing as do those containing masses of solid, frozen liquid.

In order to use all or a portion of the material packaged as described above, it is only necessary to thaw it if frozen, unlock or unseal the top closure, fold flaps 161, 162 and 164 outward along the corresponding carton walls, remove the top of bag 171 from flap 163 and fold the latter in the same way, untwist the top of bag 171 and stretch it over the top of carton 160 and over the folded flaps so that it engages notches 170. From Figure 37, which illustrates the container at this stage, it will be apparent that all or a part of the contents of bag 171 can readily be poured or dispensed therefrom. If all of the material is not used at one time, the package can be closed by reversing the procedure described.

From the foregoing it is apparent that convenient methods have been described for sealing fluent and other materials within bags irrespective of whether or not they are elastic, merely flexible and not elastic, or provided with elastic material only adjacent the mouth thereof.

This application is a continuation in part of my copending application Serial Number 350,853, filed August 3, 1940.

While the foregoing description sets forth certain preferred forms of the present invention, numerous changes may be made in the construction without deviating from the spirit thereof, and it is therefore desired that the present embodiments be considered in all respects as illustrative and not restrictive, reference being had to the appended claims rather than to the foregoing description to indicate the scope of the invention.

I claim:

1. An improved package comprising a container of fibre-board or the like having a body portion and a plurality of flaps hingedly attached to said body portion to form a top closure therefor, and a bag-like lining element of flexible, liquid-impervious material, having a mouth portion sealed by twisting the material adjacent said mouth portion, said mouth portion of said lining element gripping one of said flaps to prevent untwisting of the mouth.

2. An improved package comprising a container having a body portion and a plurality of flaps hingedly attached thereto to form a top closure, and a bag-like lining element of flexible, liquid-impervious material having a mouth portion and sealed by twisting adjacent said mouth portion, at least said mouth portion of said lining element having elastic characteristics and one of said flaps being inserted in said mouth portion and gripped thereby for preventing untwisting of the mouth.

3. An improved package according to claim 2 wherein said body portion is of rectangular cross-section and at least two of said flaps on opposite sides thereof have a length such that they do not overlap when folded toward each other, one of said flaps being provided with cut back portions or notches on its lateral edges adjacent its end to receive said extended mouth portion.

4. The process of packaging fluent material or the like which comprises inserting a bag of flexible material having a mouth portion and a neck portion adapted to be closed by twisting into a container, removably securing the mouth portion in open position to said container, filling a major portion of the bag with said fluent material, detaching the mouth portion and twisting the neck portion to close the bag, and removably securing the mouth portion with reference to the container to prevent untwisting of the neck portion.

5. The process of packaging fluent material or the like which comprises inserting a bag of flexible and elastic material having a mouth portion and a neck portion adapted to be closed by twisting into a container having top closure flaps, filling a major portion of the bag with said fluent material, twisting the neck portion to close the bag and form a seal, stretching the mouth portion over one of the top flaps to prevent untwisting of the neck portion, and closing the rest of the flaps to complete the top closure of the container.

6. The method according to claim 14 which includes reducing the air pressure within the bag after the filling step and prior to the completion of the twisting step.

7. An improved package for fluent or relatively small solid materials comprising an outer fiberboard container, an elastic bag-like lining element within the container having a material-receiving portion, a mouth portion and a neck portion, said neck portion being twisted to form a closure for said material-receiving portion, and means for holding said mouth portion in a fixed position with reference to said container, whereby untwisting of said neck portion is prevented, said means being a portion of the container having gripping engagement with the twisted mouth portion and holding said mouth portion in an extended condition out of contact with said body portion, and means for closing the container.

8. An improved package for fluent or relatively small solid materials comprising an outer fiberboard container having top closure flaps thereon, an elastic bag-like lining element within the container enclosing a desired quantity of one of said materials, said bag being twisted to provide a substantially vapor-tight seal for the contents thereof, one of said flaps being inserted in the portion of the bag above the twist seal for securing the portion of the bag above the twist seal against rotational movement, whereby untwisting of the twist seal is prevented.

9. An improved package for fluent or relatively small solid material comprising an outer container having an open end, an inner container of flexible material enclosed within the outer container and substantially conforming to the interior thereof, said inner container having its mouth portion adjacent the open end of the outer container twisted to form a seal, means in fixed relation to the outer container and of greater rigidity than the flexible material of the inner container and having gripping engagement with the twisted mouth portion for holding the mouth in its twisted position within the outer container to preserve the seal, and means for closing the container.

10. An improved package for fluent or relatively small solid material comprising an outer container having an open end, an inner container of flexible material enclosed within the outer container and substantially conforming to the interior thereof, said inner container having its mouth portion adjacent the open end of the outer container twisted to form a seal, means carried by the outer container in fixed relation thereto and of greater rigidity than the flexible material of the inner container and having gripping engagement with the twisted mouth portion for holding the mouth in its twisted position within the outer container to preserve the seal, and means for closing the container.

11. An improved package for fluent or relatively small solid material comprising an outer container having an open end, an inner container of flexible material enclosed within the outer container and substantially conforming to the interior thereof, said inner container having its mouth portion adjacent the open end of the outer container twisted to form a seal, means carried by the inner container in fixed relation to the outer container and of greater rigidity than the flexible material of the inner container and having gripping engagement with the twisted mouth portion for holding the mouth in its twisted position within the outer container to preserve the seal, and means for closing the container.

12. An improved package comprising a container having a body portion and a plurality of flaps hingedly attached thereto to form a top closure, and a bag-like lining element of flexible, liquid-impervious material having a mouth portion sealed by twisting adjacent said mouth portion, at least said mouth portion of said lining element having elastic characteristics and engaging over one of said flaps to grip the same and prevent untwisting of the mouth.

13. The method of packaging fluent or relatively small solid materials which comprises inserting an open mouthed bag of flexible material in a container to form a lining element, said bag having a material receiving portion, a neck portion, and a mouth portion, filling a major portion of the volume of said lining element with the material to be packaged, twisting said neck portion of the lining element adjacent the mouth portion thereof to produce a seal, and inserting a portion of the container in the mouth portion of the lining element for gripping engagement therewith to prevent untwisting of said twisted neck portion, and closing the container.

14. The method of packaging loose fluent solid material which comprises inserting an open mouthed bag of elastic material in a container to form a lining element, said bag having a material receiving portion, a neck portion and a mouth portion, over-filling said material receiving portion with said material to cause stretching of the bag wall, subjecting the container, bag and contents to vibration to cause the particles of the contents to be rearranged into close-packing condition, twisting the neck portion to form a twist seal adjacent the contents while said close-packing condition persists to hold the wall of the bag under tension, inserting a portion of the container in the mouth portion of the lining element for gripping engagement therewith to prevent untwisting of said neck portion, and closing the container.

15. A process of packaging fluent material which comprises selecting a bag of flexible material having a mouth portion and a neck portion adapted to be closed by twisting, securing the mouth portion to a relatively rigid rim member to retain the mouth in distended condition, inserting the bag into a container, introducing a substantial quantity of material into the bag, twisting the neck portion to close the bag and inserting the rim member into the container in frictional contact therewith to prevent untwisting of the neck portion.

16. The process of packaging fluent material or the like which comprises selecting a bag of flexible material having a mouth portion and a neck portion adapted to be closed by twisting, folding the mouth portion over the periphery of a relatively rigid rim member to retain the mouth in open condition, inserting the bag into a container, introducing the material to be packed into the bag, twisting the neck portion to close the bag, inserting the rim member into the container to prevent untwisting of the neck portion, and closing the container.

17. The process of packaging fluent material or the like which comprises selecting a bag of rubber-like material having a mouth portion and a neck portion adapted to be closed by twisting, stretching the mouth portion over the periphery of a relatively rigid rim member to retain the mouth in distended condition, inserting the bag into a container, filling a major portion of the volume of the bag with the material to be packed, producing a twisting movement in the neck portion whereby a twist will occur at such a point as to cut off a small portion of the bag contents from the body thereof thus closing the bag and excluding excess air therefrom, inserting the rim member into the container to prevent untwisting of the neck portion, and closing the container.

18. An improved package comprising an outer container, a flexible bag-like lining element within the container having a material receiving portion, a mouth portion and a neck portion, said neck portion being twisted to form a seal for the contents of said material receiving portion, and a relatively rigid rim member secured to said mouth portion and in frictional contact with said outer container to prevent untwisting of said neck portion.

19. An improved package comprising an outer container of polygonal cross-section, a flexible bag within the container having a material receiving portion, a mouth portion, and a neck portion, said neck portion being twisted to form a seal for the contents of said material-receiving portion, and a relatively rigid rim member secured to said mouth portion, said rim member being of such size and configuration that it engages the walls of said container, whereby untwisting of said neck portion is prevented.

20. An improved package according to claim 19 wherein said bag is made of vapor-impervious elastic material.

21. The combination of a tubular outer container provided with an end opening, a bag-like lining element receivable within said container having a material-receiving portion, a mouth portion and a flexible neck portion, and relatively rigid retention means secured to said mouth portion for engaging said container to prevent rotational movement of said mouth portion relative to said container.

22. The combination of claim 21 wherein at least said mouth and neck portions have elastic properties, and said mouth portion is secured to said retention means by being stretched thereover.

23. An improved package comprising an outer container of rectangular cross-section, a flexible and elastic bag within the container having a material-receiving portion, a mouth portion and a neck portion, said neck portion being twisted to form a seal for the contents of said material-receiving portion, and a relatively rigid rim member secured to said mouth portion by being stretched thereover, said rim member substantially conforming in outline to the cross-section of said container, whereby untwisting of said neck portion is prevented.

24. An improved package comprising an outer container of rectangular cross-section, a flexible and elastic bag within the container having a material-receiving portion, a mouth portion and a neck portion, said neck portion being twisted to form a seal for the contents of said material-receiving portion, and a relatively rigid rim member secured to said mouth portion by being stretched thereover, said rim member being adapted to be received in said container and provided with hingedly connected marginal flaps extending downwardly adjacent the side walls of said container, whereby untwisting of said neck portion is prevented.

25. An improved package comprising an outer container of rectangular cross-section, a flexible and elastic bag within the container having a material-receiving portion, a mouth portion and a neck portion, said neck portion being twisted to form a seal for the contents of said material-receiving portion, and a relatively rigid rim member secured to said mouth portion by being stretched thereover, said rim member comprising a pair of hingedly connected portions having one of their lateral dimensions greater than smallest distance between oppositely disposed side walls, whereby untwisting of said neck portion is prevented.

RICHARD R. WALTON.